United States Patent
Palvoelgyi et al.

(10) Patent No.: US 7,063,226 B2
(45) Date of Patent: Jun. 20, 2006

(54) FUEL TANK WITH LID

(75) Inventors: Sander Palvoelgyi, Gleisdorf (AT); Gunther Pozgainer, Graz (AT)

(73) Assignee: Tesma Motoren und Getriebetechnik (AT)

( * ) Notice: Subject to any disclaimer, the term of this patent is extended or adjusted under 35 U.S.C. 154(b) by 133 days.

(21) Appl. No.: 10/052,185

(22) Filed: Jan. 18, 2002

(65) Prior Publication Data

US 2002/0096522 A1  Jul. 25, 2002

(30) Foreign Application Priority Data

Jan. 19, 2001  (AT)  ............... GM044/2001

(51) Int. Cl.
B65D 41/06 (2006.01)

(52) U.S. Cl. ............... 220/293; 220/304; 220/DIG. 33; 220/378; 220/86.2; 220/4.14; 220/601

(58) Field of Classification Search ............... 220/378, 220/804, 601, 4.14, 246, 210, 640, 304, 86.2, 220/DIG. 33, 657, 295, DIG. 32, 293, 301, 220/562, 643; 280/830
See application file for complete search history.

(56) References Cited

U.S. PATENT DOCUMENTS

| | | | | |
|---|---|---|---|---|
| 1,417,341 A * | 5/1922 | McGarrahan | ............... | 220/304 |
| 1,459,903 A * | 6/1923 | Behringer | ............... | 220/288 |
| 2,209,081 A * | 7/1940 | Rocic | ............... | 220/214 |
| 2,316,507 A * | 4/1943 | Dykeman | ............... | 220/302 |
| 2,422,158 A * | 6/1947 | Wolfram | ............... | 285/233 |
| 2,436,407 A * | 2/1948 | Stephens | ............... | 220/378 |
| 2,625,297 A * | 1/1953 | Koppel | ............... | 220/592.19 |
| 3,192,942 A * | 7/1965 | Manor et al. | ............... | 137/246.19 |
| 3,280,372 A * | 10/1966 | De Pew | ............... | 361/212 |
| 3,343,707 A * | 9/1967 | De Pew et al. | ............. | 220/246 |
| 3,401,647 A * | 9/1968 | Ingram | ............... | 105/377.08 |
| 4,027,777 A * | 6/1977 | Blanke, Jr. | ............... | 220/295 |
| 4,285,440 A | 8/1981 | Adams | | |
| 4,434,910 A * | 3/1984 | Groult | ............... | 220/804 |
| 4,467,937 A * | 8/1984 | Shaw | ............... | 220/246 |
| 4,589,564 A * | 5/1986 | Olster et al. | ............... | 220/582 |
| 4,699,292 A * | 10/1987 | Farrell | ............... | 220/812 |
| 4,874,573 A * | 10/1989 | Wood et al. | ............... | 376/272 |
| 5,031,790 A * | 7/1991 | Keller | ............... | 220/203.2 |
| 5,036,996 A * | 8/1991 | Epstein | ............... | 220/316 |
| 5,071,140 A * | 12/1991 | Quevedo del Rio | ........ | 277/608 |
| 5,074,428 A * | 12/1991 | Wildfeuer | ............... | 220/322 |
| 5,167,340 A * | 12/1992 | Shaw | ............... | 220/295 |
| 5,405,040 A * | 4/1995 | Keller | ............... | 220/304 |
| 5,582,318 A * | 12/1996 | Dietrich | ............... | 220/319 |
| 5,680,953 A * | 10/1997 | Baughman | ............... | 220/288 |
| 5,709,313 A * | 1/1998 | Richoux et al. | ............. | 220/601 |

(Continued)

FOREIGN PATENT DOCUMENTS

DE  26 58 713 A1  7/1977

(Continued)

Primary Examiner—Nathan J. Newhouse
Assistant Examiner—James Smalley
(74) Attorney, Agent, or Firm—Clark Hill PLC

(57) ABSTRACT

A fuel tank with an opening, on which a lid is mounted in a removable manner by means of thread or bayonet, is intended to provide a sustained and sealed closure under all conditions. For this purpose, two sealing rings are arranged between the sealing surfaces, the inner one being liquid-tight and the outer one being made of an elastomer with high permeation resistance. The sealing surfaces within the outer sealing ring have a narrow gap leading as far as the outer sealing ring, and the fuel tank has a reinforcement surrounding the opening.

7 Claims, 1 Drawing Sheet

U.S. PATENT DOCUMENTS

| | | | | |
|---|---|---|---|---|
| 5,746,359 A * | 5/1998 | Stanek et al. | | 222/542 |
| 5,951,050 A | 9/1999 | Siekmann | | |
| 6,170,691 B1 * | 1/2001 | Morris et al. | | 220/304 |
| 6,332,555 B1 * | 12/2001 | Stangier | | 220/562 |
| 6,360,765 B1 * | 3/2002 | Pozgainer | | 137/15.01 |
| 6,516,964 B1 * | 2/2003 | Gerhardt et al. | | 220/4.14 |
| 6,547,089 B1 * | 4/2003 | Pozgainer et al. | | 220/304 |
| 6,651,707 B1 * | 11/2003 | Zimmer et al. | | 141/286 |
| 6,685,045 B1 * | 2/2004 | Palvolgyi | | 220/304 |
| 6,698,611 B1 * | 3/2004 | Matsubara et al. | | 220/374 |
| 2003/0173776 A1 * | 9/2003 | Morohoshi et al. | | 285/189 |

FOREIGN PATENT DOCUMENTS

| | | |
|---|---|---|
| DE | 199 43 673 A1 | 3/2001 |
| DE | 199 57 253 A1 | 5/2001 |
| FR | 2688485 A1 * | 9/1993 |

* cited by examiner

FUEL TANK WITH LID

FIELD OF THE INVENTION

The present invention relates to a fuel tank for motor vehicle having an opening on which a lid is mounted in a removable manner by way of threads or bayonet wherein the opening and lid each have a sealing surface.

BACKGROUND OF THE INVENTION

Fuel tank openings with lids can be used for different purposes, for example, for filling the tank, but in particular for carrying out maintenance work on components situated inside the tank, for example, on liquid level indicators or fuel pumps.

The lid is intended to seal the opening in a reliable manner, even after a lengthy period of operation, and to be easily removable. Irrespective of whether the tank is made of metal or plastic, it has a relatively thin wall, so that there is a risk of the closing force causing deformation of the edge. This leads to leakages. Sealing is a particular problem in these types of closures because light fuels are volatile and, as vapors, can also diffuse through solid bodies such as sealing rings. The available structural height is also limited.

SUMMARY OF THE INVENTION

The present invention is intended to remedy these disadvantages and to make available a fuel tank closure which provides sustained sealing under all conditions.

According to one aspect of the invention, this is achieved by the fact that a) two sealing rings are arranged between the sealing surfaces of the opening and lid, an inner sealing ring being liquid-tight and an outer sealing ring being made of an elastomer with high permeation resistance, b) the sealing surfaces within the outer sealing ring have a narrow gap leading as far as the outer sealing ring, and c) the fuel tank has a reinforcement surrounding the opening.

The liquid seal is provided by the inner sealing ring, while the outer sealing ring provides a vapor barrier. For this purpose, the outer sealing ring is not only made of a suitable material, but, because of the narrow gap leading up to it, also has a small contact surface with the vapor waiting on its inner side. Since the permeation begins on the surface of the sealing ring, the small contact surface means a further reduction in permeation. The reinforcement ensures that the sealing surfaces are not deformed by the closure forces and do not loose their leak tightness.

According to one embodiment of the invention, the sealing surfaces extend substantially conically inward, and the sealing surface of the lid has grooves for receiving and seating the sealing rings. The conical shape affords sufficient sealing forces at low clamping forces and saves space since the cone can project into the inside of the tank.

According to another embodiment of the invention, the sealing surfaces extend inward with their axes substantially normal, and the sealing surface of the fuel tank has grooves for receiving and seating the sealing rings. In this position of the sealing surfaces, the contact pressures on the two sealing rings can be particularly finely matched to one another and the sealing rings can be fitted and inspected without risk of damage.

The reinforcement is preferably a part which is welded onto the wall of the tank, surrounds the opening and includes one half of the thread or bayonet. The closure forces are thus taken up directly by the reinforcement and not via the tank wall. The stiffness thereby obtained in the area around the opening contributes to the leak tightness.

In one configuration, the reinforcement is arranged on the inside of the wall of the tank, and the edge of the opening is designed as a sealing surface. Thus, the leak tightness is not dependent on the nature of the connection between the reinforcement and the tank wall. The forces are particularly favorable, especially in the case of conical sealing surfaces, when the edge of the opening for forming the sealing surface is flanged inward, and the reinforcement forms a surrounding shoulder which supports the inwardly flanged edge of the opening, especially when the reinforcement inwardly adjoining the surrounding shoulder also forms one half of the thread or bayonet closure.

In another configuration, the reinforcement is arranged on the outside of the wall of the tank and a sealing surface is formed on it. This variant is simpler from the production point of view and ensures the shape stability of the one sealing surface, which fact contributes to sustained leak tightness. In a refinement thereof, the reinforcement has a surrounding rectangular profile whose vertical surfaces are connected to the tank and whose lid surface has grooves for receiving the sealing rings. This affords a particularly stiff bearing of the sealing rings and thus particularly good sealing. In order to avoid excessive pressing of the sealing rings, a contact bead can also be provided.

In order to avoid the penetration of moisture or dirt, and thus corrosion, the lid can also be provided with a lip seal on its outer edge.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
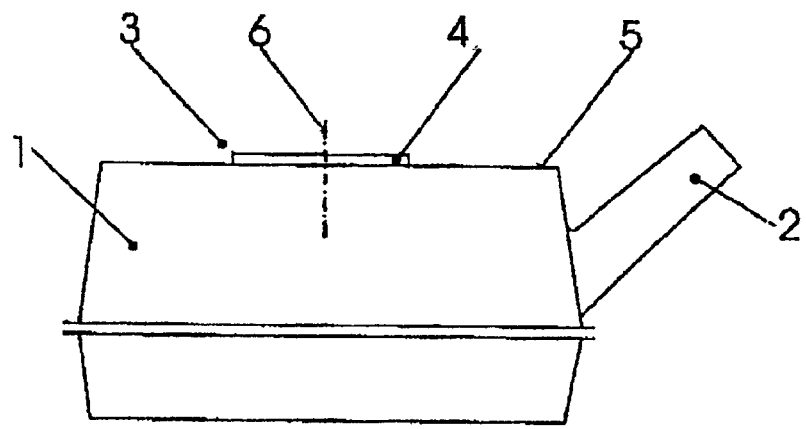
FIG. 1 is a side view of a conventional fuel tank with an opening and lid.

Referring to FIG. 1, a fuel tank for storing fuel is generally shown at 1. The fuel tank 1 has a filler attachment 2 and, in its upper wall 5, an opening 3 which is closed by a lid 4. The lid 4 may have measuring or pumping elements on its inside and may be removed for repair or maintenance purposes. In plan view, the lid 4 is symmetrical, in particular circular, as is indicated by broken line showing the axis of symmetry or axis of rotation 6.

Figure 2:
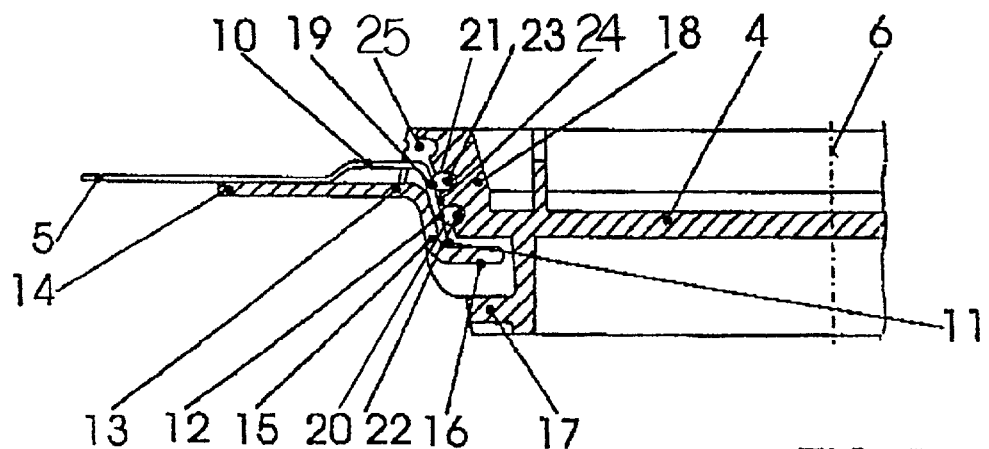
FIG. 2 is a cross-sectional view of the fuel tank opening and lid.

In the embodiment shown in FIG. 2, the upper wall 5 of the fuel tank 1 has a raised portion 10 which surrounds the opening 3 which, further to the inside, is substantially conically inwardly flanged forming a lip 11 presenting the edge of the opening 3. The surface of the conically inwardly flanged lip 11 directed toward the center axis of rotation 6 forms the first sealing surface 12. A reinforcement 13 similarly surrounding the opening 3 is welded to the upper wall 5 via a planar portion 14. For this purpose, any suitable welding method can be used, for example, resistance welding or spot welding. Adjoining the planar portion 14 toward the inside, the reinforcement 13 forms a shoulder 15 which can support the conically inwardly flanged lip 11 of the wall 5 against the sealing forces acting on the latter. Further inward still, the reinforcement 13 is flanged inward to form a collar 16 which forms the first half of a bayonet closure.

The lid 4 has a peripheral part 18 which in its lower part is flanged outward to form a collar 17 which forms the second half of the bayonet closure and cooperates with the first half thereof. The peripheral part 18 further forms a conical second sealing surface 19. Conical should be understood as both conically in the exact geometric sense and also in general as an inwardly and downwardly extending narrowing. In this second sealing surface 19 there is provided a first groove 20 for receiving and seating a first sealing ring 22 and a second groove 21 for receiving and seating a second sealing ring 23. When the lid 4 is closed, these sealing rings 22, 23 bear tightly on the first sealing surface 12 of the conically inwardly flanged lip 11.

The first sealing ring 22 provides the liquid seal and the second sealing ring 23, which is arranged downstream of the first sealing ring 22 in the direction of flow, or below, provides the seal against permeation of fuel vapors. The second sealing ring 23 is made of an elastomer with high permeation resistance. In addition, the peripheral part 18 of the lid 4 between the two grooves 20, 21 forms a narrow sealing gap 24 with the conically inwardly flanged lip 11. The narrowness of this sealing gap 24 has the effect that fuel vapors come into contact only with a very small surface of the second sealing ring 23, and the permeation entry surface is thus very small, by which means the permeation resistance of the second sealing ring 23 is further increased. Finally, a lip seal 25 is also provided on the upper edge of the peripheral part 18, which lip seal 25 bears on the raised portion 10 of the wall 5 and thus prevents penetration of dirt and moisture into the opening 3 and between the sealing surfaces 12, 19.

Figure 3:
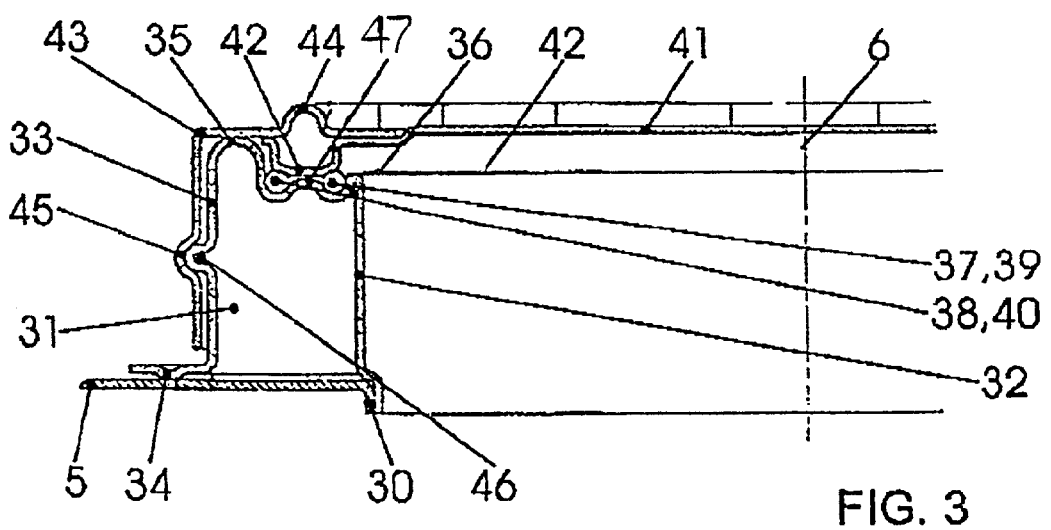
FIG. 3 is a cross-sectional view of an alternative embodiment of the fuel tank opening and lid.

In the alternative embodiment of FIG. 3, the wall 5 forms an inwardly flanged edge 30 which surrounds the opening 3 and onto which a reinforcement 31 is externally applied and welded. The reinforcement 31 has a substantially rectangular profile extending around the center axis 6 and with an inner vertical surface 32 which is welded tightly to the flanged edge 30, and with an outer vertical surface 33 which is likewise cylindrical and ends in an outwardly flanged edge with weld bosses 34 which are likewise welded to the wall 5. The approximately rectangular profile of the reinforcement 31 forms, at the top, a stop bead 35 and, adjoining the latter toward the inside, a first sealing surface 36 which has a substantially normal axis, but can also be slightly conical. In this first sealing surface 36, there is once again a first groove 37 for receiving a first sealing ring 39 and a second groove 38 for receiving a second sealing ring 40.

On its radius corresponding to the radius of the first sealing surface 36, a lid 41 is drawn downward to a second sealing surface 42. This second sealing surface 42 again forms, with the first sealing surface 36, a narrow gap 47, as was described with reference to the previous embodiment. The lid 41 is further welded to a lid flange 43 and forms a reinforcing rib 44 over the second sealing surface 42. These together form a closed profile which gives the lid 41 the stiffness required for an exact fitting of the sealing surfaces 36, 42. The lid flange 43 continues downward to a first threaded part 45, of which only one thread is shown. With this, the lid is screwed onto the second threaded part 46 in the outer vertical surface 33 of the reinforcement 31.

The invention has been described in an illustrative manner, and it is to be understood that the terminology, which has been used, it intended to be in the nature of words of description rather than of limitation.

Many modifications and variations of the present invention are possible in light of the above teachings. It is, therefore, to be understood that within the scope of the appended claims, the invention may be practiced other than as specifically described.

What is claimed is:

1. A fuel tank assembly comprising:
   a wall for enclosing a fluid;
   said wall having an upper wall and an inwardly flanged lip extending downwardly from said upper wall into said fuel tank forming an opening extending through a portion of said wall and defining a first sealing surface along the circumferential periphery of said lip;
   a removable lid for closing said opening in said wall, said lid having an outer peripheral part defining a second sealing surface along the circumferential periphery thereof facing said first sealing surface when said lid is seated in said opening;
   first and second spaced apart radial grooves formed in at least one of said first and second sealing surfaces;
   first and second sealing rings seated in said first and second grooves respectively for sealing engagement between said first and second sealing surfaces when said lid is closed against said opening;
   a sealing gap formed between said first sealing surface and the part of said second sealing surface extending between said spaced apart radial grooves for limiting the contact surface area of fuel vapors with said second sealing ring and thereby increase the permeation resistance of said sealing engagement between said lid and said opening; and
   a reinforcement member including a planar portion fixedly secured to the inside of said upper wall and a shoulder portion extending downwardly from said planar portion forming a surrounding shoulder which supports said circumferential periphery of said inwardly flanged lip defining said opening for conically supporting said lip against the sealing forces between said first and second sealing surfaces from said lid closing against said opening.

2. A fuel tank assembly as set forth in claim 1 wherein said first and second sealing surfaces extend substantially parallel and conically inwardly into said opening.

3. A fuel tank assembly as set forth in claim 2 wherein said first and second grooves extend radially around the circumference of said second sealing surface defined by said lid.

4. A fuel tank assembly as set forth in claim 3 wherein said reinforcement member includes an inwardly flanged collar and said peripheral part of said lid includes an outwardly flanged collar for overlapping engagement with said collar of said reinforcement member to secure said lid against said opening.

5. A fuel tank assembly as set forth in claim 4 wherein said first sealing ring is a liquid seal seated in said first groove adjacent said opening of said fuel tank for sealing liquid fuel in said fuel tank.

6. A fuel tank assembly as set forth in claim 5 wherein said second sealing ring is a fuel vapor seal made of an elastomer with high permeation resistance seated in said second groove and spaced from said first sealing ring by said sealing gap for sealing fuel vapor in said fuel tank.

7. A fuel tank assembly comprising:
   a wall for enclosing a fluid;

said wall having an inwardly flanged lip forming an opening extending through a portion of said wall and defining a first sealing surface along the circumferential periphery of said lip;

a removable lid for closing said opening in said wall, said lid having an outer peripheral part defining a second sealing surface along the circumferential periphery thereof facing said first sealing surface when said lid is seated in said opening;

first and second spaced apart radial grooves formed in at least one of said first and second sealing surfaces;

first and second sealing rings seated in said first and second grooves respectively for sealing engagement between said first and second sealing surfaces when said lid is closed against said opening;

a sealing gap formed between said first sealing surface and the part of said second sealing surface extending between said spaced apart radial grooves for limiting the contact surface area of fuel vapors with said second sealing ring and thereby increase the permeation resistance of said sealing engagement between said lid and said opening; and a reinforcement member fixedly secured to the inside of said wall forming a surrounding shoulder which supports said circumferential periphery of said inwardly flanged lip defining said opening for supporting said lip against the sealing forces between said first and second sealing surfaces from said lid closing against said opening;

wherein said reinforcement member includes an inwardly flanged collar and said peripheral part of said lid includes an outwardly flanged collar for overlapping engagement with said collar of said reinforcement member to secure said lid against said opening.

* * * * *